United States Patent

Erwin

[11] 4,125,109
[45] Nov. 14, 1978

[54] SOLAR OVEN

[76] Inventor: Samuel F. Erwin, Box 1737, Camp Verde, Ariz. 86322

[21] Appl. No.: 742,859

[22] Filed: Nov. 18, 1976

[51] Int. Cl.$^2$ .............................................. F24J 3/02
[52] U.S. Cl. ................................................... 126/270
[58] Field of Search ................ 126/270, 271, 299 BE, 126/389

[56] References Cited

U.S. PATENT DOCUMENTS

| | | | |
|---|---|---|---|
| 1,158,175 | 10/1915 | Cherrier | 126/270 |
| 1,424,932 | 8/1922 | Moreau | 126/271 |
| 2,429,149 | 10/1947 | Wittenberg | 126/389 X |
| 3,028,856 | 4/1962 | Daymon | 126/270 |
| 3,028,856 | 4/1962 | Daymon | 126/270 |
| 3,106,201 | 10/1963 | Steinberg | 126/270 |
| 3,391,688 | 7/1963 | Dery | 126/270 |
| 3,896,786 | 7/1975 | Clevett | 126/270 |

OTHER PUBLICATIONS

"Cooking by Solar Heat," Adams, W. Scientific American, Jun. 15, 1878, p. 376.

Primary Examiner—William F. O'Dea
Assistant Examiner—Larry Jones
Attorney, Agent, or Firm—Charles E. Cates

[57] ABSTRACT

A solar oven of improved efficiency wherein an octagonal radiation absorbing base is provided with eight primary reflectors and eight secondary reflectors to direct the solar energy thereupon. Each primary reflector is affixed to one side of the base at an angle of about 55° thereto. The triangular secondary reflectors are interposed between adjacent primary reflectors at an angle of about 57° to the base. The article to be heated is placed on the base and a transparent eight-sided cover is placed thereover. The entire apparatus is rotated and tilted so that the base is orthogonal to the incident solar energy.

10 Claims, 3 Drawing Figures

SOLAR OVEN

BACKGROUND OF THE INVENTION

The increasing interest in the development of apparatus capable of utilizing alternate or non-traditional energy sources has generated a need for devices that can effectively convert solar energy to heat and utilize that heat in an efficient manner. One important function that can be provided by apparatus utilizing solar energy is the heating and cooking of foodstuffs and the resultant replacement of the energy-intensive household oven or gas-fired barbecue cooker.

Since the energy from the sun is relatively diffuse the success of a solar oven depends in part on the gathering and concentrating of incident solar energy and on the radiation-absorbing element. Also important is the means utilized to confine or concentrate the heat generated by the absorbing element since heat losses rapidly decrease the efficiency of the apparatus and greatly increase the time required to cook the food being prepared.

Prior solar cooking devices have not found commercial acceptance due in part to their inability to concentrate substantial amounts of solar energy and return the heat generated therefrom in a relatively low cost solar oven that is compact, rugged and not complex in structure. Further, a solar oven must be capable of providing the desired cooking effect in a reasonable period of time in a variety of different ambient conditions to attract the interest of individual users.

Accordingly, the present invention is directed to a solar oven that is capable of cooking a wide variety of foodstuffs in a reasonable period of time. This solar oven provides the desired cooking in a wide variety of ambients including temperatures below 32° F. due in part to a novel manner of concentrating the incident radiation.

Also, the present invention is constructed in a manner which provides the user with ready access to the foodstuff being prepared. In addition, the orientation of the apparatus can be easily changed to insure that the benefits of the available solar energy are obtained.

SUMMARY OF THE INVENTION

This invention relates to a solar oven for converting incident solar energy to heat in order to prepare an article, typically food, contained therein.

The solar oven includes a base member having a radiation absorbing first surface on which the article to be prepared is placed. The base member has as $n$-sided configuration.

A primary reflector is located at each of the $n$-sides of the base member and is tilted or inclined outwardly of the base member to form a first angle with the first surface thereof. Solar energy incident upon the primary reflectors is reflected down on to the first surface. A secondary reflector is interposed between adjacent primary reflectors and positioned therebetween to form a second angle with the first surface of the base member. The secondary reflectors provide a means for reflecting incident solar energy to the base member, and by making the first angle different than the second angle a wider distribution of reflected solar energy is provided on the first surface of the base member.

The present invention utilizes different angles for the different sets of reflectors and thereby creates a focusing effect that enables the oven to operate in a relatively efficient manner since an increased amount of the incident energy is directed to the outer edge portions of the first surface of the base member. This permits the article being heated to be located directly on the surface of the base member without materially degrading the performance of the oven. As a result, the need for a sealed chamber located behind the radiation-absorbing surface is obviated.

An $n$-sided removable cover is provided to form the remaining portion of the oven chamber. The cover is formed of a material which permits the passage of solar energy therethrough. This defines the cooking chamber and it is readily accessible to the user without changing the attitude of the present oven in relation to the incident solar energy. Since the direction of transmission of the incident radiation varies with the movement of the sun, the second surface of the base member is hingedly mounted on a rotatable platform. As a result, the reflectors and base member can be readily moved so that the first surface is maintained orthogonal to the direction of transmission while the article is being heated and without removal of either the article or the cover.

Further features and advantages of the invention will become more readily apparent from the following detailed description of a specific embodiment when taken in conjunction with the accompanying drawings.

DETAILED DESCRIPTION OF THE PREFERRED EMBODIMENT

Figure 1:
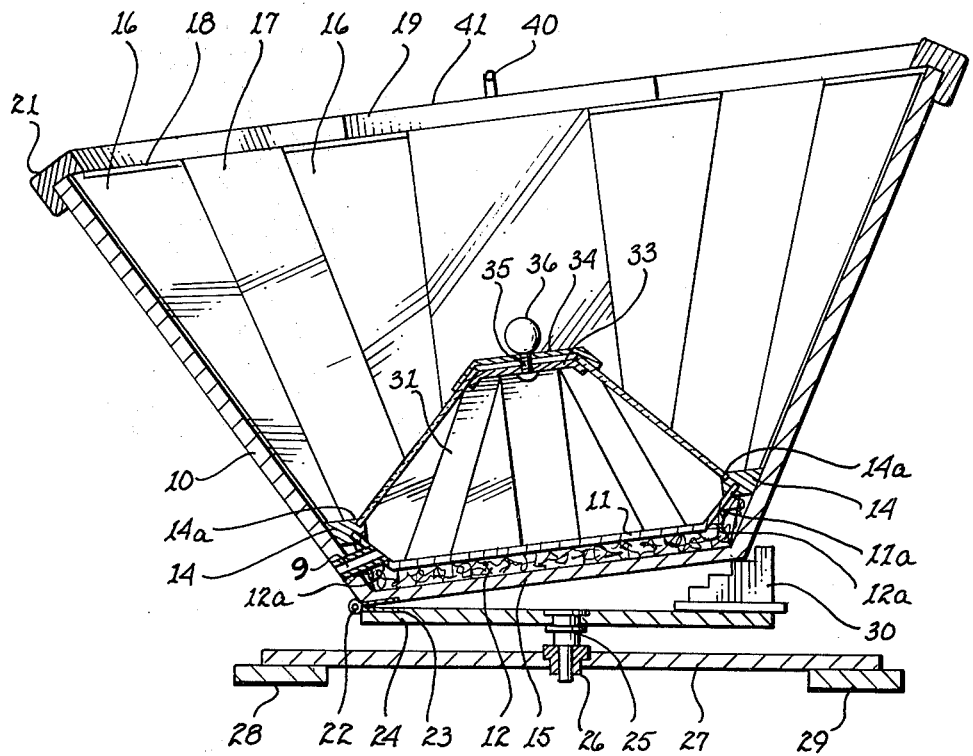
FIG. 1 is a side view in section of one embodiment of the invention taken along line A—A of FIG. 2.
Figure 2:
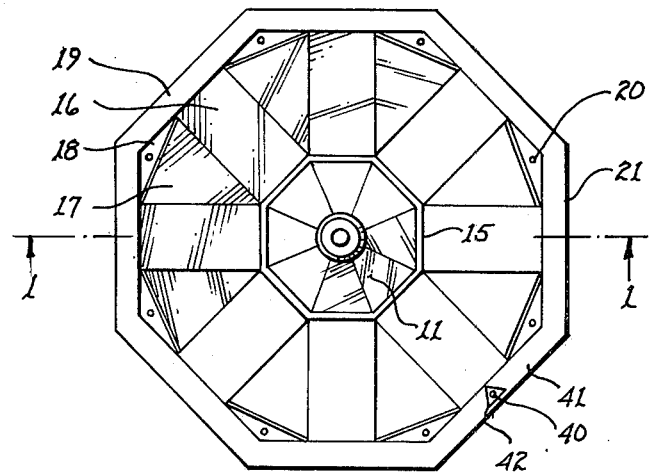
FIG. 2 is a top view of the embodiment of FIG. 1.

Referring now to FIG. 1, the solar oven is shown including a supporting frame 10 formed of molded plastic material for example. As shown in FIG. 2, frame 10 has an octagonal shape in plan view and in side view, as in FIG. 1, the shape is truncated with the eight sides being inclined outwardly at the open end of the frame.

An insulating member 12 is interposed between metal plate 11 and the bottom portion 15 of supporting frame 10. The insulating member extends along the bottom portion of frame 10 and is provided with an upwardly extending side 12a. The metal plate 11 is also provided with upwardly extending sides 11a which abut flange 14. In operation, the article to be heated is placed on the metal rack. The article may contain liquids or juices which emerge as it is heated. The sides 11a contain these liquids as the apparatus is tilted. An aperture 9 vents the oven interior to the ambient atmosphere.

The upper exposed surface of metal plate 11 is provided with a radiation-absorbing coating, typically a dull black finish. The radiant solar energy incident thereon is absorbed thereby and converted to heat. The insulating member 12 serves to reduce heat loss from metal plate 11 in the direction of the supporting frame 10. In practice, insulating member 12 is provided with the flanged portion 14 about its periphery to insulate the adjacent metal flange and thereby reduce undesired heat loss to the support frame.

The plan view of FIG. 2 clearly shows the octagonal shape of plate 11 and the exposed edge of flange 14. If desired, the plate can be easily removed for cleaning or replacement of the radiation absorbing coating if desired. A rectangular primary reflector 16 is located adjacent each side of plate 11 and is secured in the supporting frame by clamping member 21 which extends about the upwardly exposed portion of support frame 10. The clamping member 21 is removably secured to the frame 10 by suitable fastening means such as screws or bolts. Thus, member 21 maintains the upper edge of the primary reflectors in a fixed position. The lower portion of the primary reflectors are removably secured by use of a flexible adhesive such as one of the many commercially available silicon compositions. While other adhesives may be utilized if desired this type has been found to permit ready replacement of a reflector if it is damaged and, also, to increase the shock resistance of the reflector so mounted. The primary reflectors are typically made of reflective glass, but other sheet materials with reflecting coatings may be utilized.

A secondary reflector 17, triangular in surface area, is interposed between adjacent primary reflectors 16. The uppermost portion of each secondary reflector is secured to the support frame 10 by one of the corner mounts 18. At each corner between adjacent octagonal sides of support frame 10 a corner brace, not shown, is secured. The secondary reflector, associated with each corner of the support frame is secured to a corner brace by the corresponding mount 18 which extends inwardly of the support frame and is provided with a flange which extends over the top edge of the secondary reflector. Screws 20 fasten the mounts to the corner brace of the support frame. The bottom portion of the secondary reflectors is removably secured to the support frame by the use of a flexible adhesive. Thus, the secondary reflectors can be readily replaced if necessary by removing the corresponding screw 20.

The support frame 10 is provided with a hinge 22 which is fastened to the frame and to pedestal 24. A recess is located in the base of the frame to accommodate the hinge when the support frame is positioned in a flat manner on the surface of the pedestal. As shown, the apparatus is tilted so as to adjust to the angle of transmission of the solar energy. In operation, the most effective operation of the apparatus is obtained when the plate 11 is maintained essentially orthogonal to the direction of transmission. This orientation can be maintained by tilting the support frame and inserting support block 30 and also through the rotation of pedestal 24.

Pedestal 24 is coupled to fixed platform 27 by a flush-mounted rotation pin having a portion of reduced diameter that fits within bushing 26. This permits relative rotation of the pedestal while platform 27, spaced from the ground by legs 28 and 29, remains fixed.

The article to be heated is placed within the region bounded by plate 11 and removable cover 31. The cover is formed of a lightweight material which permits the passage of the solar energy therethrough, such as a plastic, although glass has been utilized in certain embodiments. The cover is eight-sided and forms a truncated structure with inner draw plate 33 and top plate 34 being urged together by threaded member 35 which engages handle 36. Adjacent edges of the eight cover panels are flexibly secured to one another by the use of a silicone adhesive. This adhesive can also be utilized where the panels of cover 31 contact plates 33 and 34.

The edge dimension of the panels of cover 31 are made to not exceed the width of the primary reflectors so that the cover fits within shelf 14a of the flange 14 and the flow of ambient air into the oven region is eliminated. The height of the panels of cover 31 is selected so that the angle formed between the panels and the plate 11 is about 45°. This permits the solar energy incident thereon in this apparatus to pass through to the plate 11.

Figure 3:
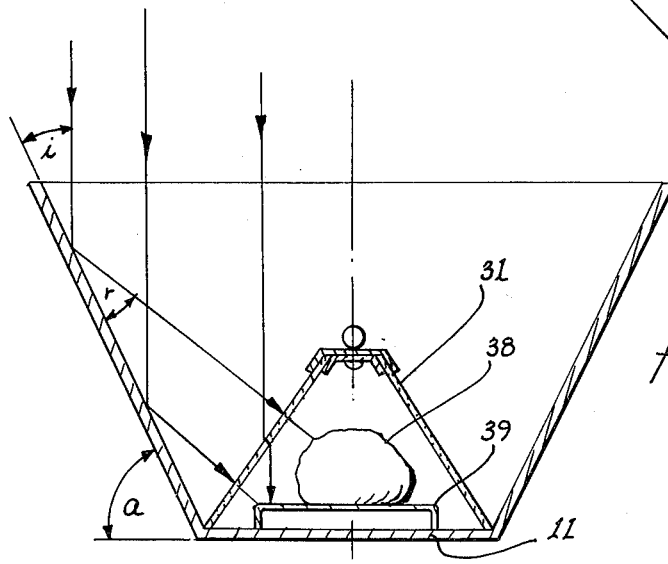
FIG. 3 is a side schematic view illustrating the reflection of incident solar energy on to the base member.

The improved efficiency of the solar oven is due in part to the use of primary and second reflectors mounted within the apparatus at first and second angles to the radiation-absorbing surface of plate 11. The primary reflectors in the preferred embodiment are inclined to form approximately a 55° angle with plate 11. Referring to FIG. 3, solar energy incident thereon at an angle of incident is reflected at an equal angle. The distribution of the reflected energy on the absorbing surface of plate 11 is determined primarily by the angle as noted from FIG. 3. By increasing this angle, the radiation incident on plate 11 is non-uniform in that it tends to be concentrated at the outer portions of the plate. The high temperature, typically 500° F., within the oven region is due to, in part, the wider distribution and the location of the article 38 being heated in the area of lesser concentration of incident solar energy.

In practice, it has been found desirable to utilize a wire support 39 to elevate the surface but enables an increased amount of radiation to strike the surface of plate 11.

A further concentration of incident solar energy is obtained in the present solar oven by inclining the secondary reflectors 17 at a second angle with respect to plate 11. This second angle is made greater than the first angle of the primary reflectors by 2°. In the preferred embodiment, the second angle is approximately 57°. Referring to FIG. 3, the increasing of angle a results in a more pronounced gradient for the energy incident upon plate 11 and further increases the temperature within the oven region. As a result of the inclining of reflectors at relatively steep angles and inclining different sets of reflectors at different angles, the temperature within the bounded oven region reaches 300° F. in ambient temperatures of 18°.

As mentioned previously, the support frame is tilted and rotated so that the surface of plate 11 is orthogonal to the direction of transmission of the incident solar energy. When this orientation is obtained and maintained during the operation, incident rays impinge on the panels of cover 31. As noted in FIG. 3, the solar energy incident on cover 31 is not reflected but is passed through on a slightly different path to aid in the heating of the oven region. In the preferred embodiment, the top plate 34 is provided with a radiation absorbing coating and thus it experiences an increased temperature due to the incident radiation. This tends to reduce the vertical temperature gradient within the oven region and promote heating of the article.

Indicator post 50 is provided to maintain an orthogonal orientation to the sun. When the post 40 casts no shadow on the rim 41 the oven is in the desired orientation. A triangular area 42 indicates acceptable deviations. When the shadow of the post 40 approaches the outer edge of the triangle the oven should be adjusted.

In the preferred embodiment tested and operated in a 40° ambient environment, a twelve pound turkey was fully cooked in about four hours. While the above description referred to a preferred embodiment successfully tested and operated, it is recognized that many variations and modifications may be made therein without departing from the spirit and scope of the invention.

What is claimed is:

1. A solar oven comprising means defining an oven chamber for receiving food to be cooked comprising: a base having $n$ sides and a solar radiation absorbing surface; a removable solar radiation-pervious pyramidal cover having $n$ sides adapted to closely register with said $n$ sides of said base, said sides joined together at their edges by silicone adhesives and at their apex by a top plate and inner draw plate and draw screw, and a handle, whereby food to be cooked may be inserted and removed without changing the attitude of the oven relative the sun, means for preventing movement of said cover relative said base while the oven is in use means for orienting said base member comprising a support plate; a turntable rotatably mounted on said support plate; hinge means coupled between said turntable and said base member and means for concentrating and directing incident solar radiation into said chamber.

2. The oven of claim 1 wherein said sides of said cover are oriented at approximately 45° to the direction of transmission of solar radiation.

3. The oven of claim 1 with the addition of $n$-secondary reflectors interposed between said primary reflectors.

4. The oven of claim 3 wherein the difference between said first and second angles is approximately 2°.

5. The oven of claim 3 wherein said primary reflectors are rectangular and said secondary reflectors are triangular.

6. The oven of claim 3 wherein said first angle is less than said second angle.

7. The oven of claim 1 with the addition of means for insulating said base from the ambient atmosphere.

8. The oven of claim 1 wherein $n$ equals 8.

9. A solar oven comprising means defining an oven chamber for receiving food to be cooked comprising a base having $n$ sides and a solar radiation absorbing surface; a removable solar radiation-pervious pyramidal cover having $n$ sides adapted to closely register with said $n$ sides of said base, and a handle, whereby food to be cooked may be inserted and removed without changing the attitude of the oven relative the sun, means for preventing movement of said cover relative said base while the oven is in use, and means for concentrating and directing incident solar radiation into said chamber comprising $n$ primary reflectors inclined to form a first angle with respect to said surface of said base and means for orienting said base member comprising a support plate; a turntable rotatably mounted on said support plate; hinge means coupled between said turntable and said base member to permit movement of a portion of said base member from said turntable; and means for supporting said portion of said base member in spaced relationship to said turntable.

10. The oven of claim 9 wherein a side of each of said reflectors registers with a side of said base.

* * * * *